(12) United States Patent
Miller et al.

(10) Patent No.: US 8,806,844 B2
(45) Date of Patent: Aug. 19, 2014

(54) FLAIL MOTOR HEAD ATTACHMENT

(75) Inventors: Benton Lloyd Miller, North Platte, NE (US); Michael Paul Sides, Hershey, NE (US)

(73) Assignee: DOM, L.L.C., North Platte, NE (US)

(*) Notice: Subject to any disclaimer, the term of this patent is extended or adjusted under 35 U.S.C. 154(b) by 0 days.

(21) Appl. No.: 13/404,959

(22) Filed: Feb. 24, 2012

(65) Prior Publication Data
US 2013/0219847 A1    Aug. 29, 2013

(51) Int. Cl.
*A01D 43/00* (2006.01)

(52) U.S. Cl.
USPC .......................................................... 56/156

(58) Field of Classification Search
CPC ... A01D 34/453; A01D 34/44; A01D 34/668; A01D 61/002
USPC .................... 56/156, 13.9, 294, 505, 320.1
See application file for complete search history.

(56) References Cited

U.S. PATENT DOCUMENTS

| | | | |
|---|---|---|---|
| 2,513,966 A | 7/1950 | Pool et al. | |
| 2,727,347 A * | 12/1955 | Fenster et al. | 56/1 |
| 2,729,048 A | 1/1956 | Dort | |
| 2,841,946 A * | 7/1958 | Sutherland et al. | 56/289 |
| 3,020,696 A | 2/1962 | Thurow et al. | |
| 3,043,080 A * | 7/1962 | Mott | 56/294 |
| 3,122,871 A * | 3/1964 | Brilts et al. | 56/294 |
| 3,177,640 A * | 4/1965 | Mott, Jr. | 56/294 |
| 3,324,639 A * | 6/1967 | Halls et al. | 56/14.4 |
| 3,400,527 A * | 9/1968 | Woodring | 56/294 |
| 3,417,557 A * | 12/1968 | Brewer | 56/294 |
| 3,451,199 A * | 6/1969 | Molzahn | 56/14.4 |
| 3,479,805 A * | 11/1969 | Soteropulos | 56/14.1 |
| 3,523,412 A | 8/1970 | Dacyszyn | |
| 3,527,038 A * | 9/1970 | Wood et al. | 56/294 |
| 3,608,842 A * | 9/1971 | Engler | 241/194 |
| 3,633,349 A * | 1/1972 | Mathews | 56/294 |
| 3,645,076 A * | 2/1972 | Aldred | 56/294 |
| 3,657,869 A * | 4/1972 | Ayranto | 56/294 |
| 3,678,671 A * | 7/1972 | Scarnato et al. | 56/505 |
| 3,693,335 A * | 9/1972 | Mathews | 56/294 |
| 3,831,357 A * | 8/1974 | Mathews | 56/294 |
| 3,831,359 A * | 8/1974 | Mathews | 56/294 |
| 3,927,511 A | 12/1975 | Burris et al. | |
| 3,977,165 A * | 8/1976 | Klinner et al. | 56/16.4 R |

(Continued)

FOREIGN PATENT DOCUMENTS

CN        201869589 U  *  6/2011  ............. A01F 17/02

*Primary Examiner* — Árpád Fábián-Kovács
(74) *Attorney, Agent, or Firm* — Samuel Digirolamo; Husch Blackwell LLP

(57) ABSTRACT

A flail rotor head attachment for use with any type harvesting machine having crop residue processing elements and including an input opening for receiving crop residue. The attachment includes a frame structure for operatively coupling the attachment to the harvesting machine, a flail rotor and an auger each mounted on the frame structure and a drive mechanism for rotating the flail rotor and the auger in the same direction. The flail rotor includes a plurality of cutting elements for picking up and chopping crop residue from a field, each of the cutting elements being attached to a separate bracket member for allowing free movement of each relative to each other. The auger includes at least two flightings positioned in opposite directions for funneling crop residue towards the opening of the harvesting machine. A shield member is positioned under the auger and adjacent to the flail rotor to facilitate the funneling of the crop residue from the flail rotor to the auger.

8 Claims, 10 Drawing Sheets

(56) References Cited

U.S. PATENT DOCUMENTS

| | | | |
|---|---|---|---|
| 4,085,570 A * | 4/1978 | Joray et al. | 56/2 |
| 4,161,859 A | 7/1979 | Storm et al. | |
| 4,241,568 A * | 12/1980 | Mathews | 56/294 |
| 4,304,089 A | 12/1981 | Mescheryakov et al. | |
| 4,464,890 A | 8/1984 | Scholtissek et al. | |
| 4,495,756 A | 1/1985 | Greiner et al. | |
| 4,631,910 A * | 12/1986 | Doyen et al. | 56/505 |
| 4,970,849 A | 11/1990 | Friesen | |
| 5,005,342 A * | 4/1991 | Lundahl et al. | 56/10.2 R |
| 5,044,147 A * | 9/1991 | Klinner | 56/14.6 |
| 5,090,187 A | 2/1992 | Mews | |
| 5,111,645 A * | 5/1992 | Klinner | 56/364 |
| 5,485,718 A * | 1/1996 | Dallman | 56/294 |
| 5,570,571 A * | 11/1996 | Dallman | 56/249.5 |
| 5,666,794 A * | 9/1997 | Vought et al. | 56/15.2 |
| 5,894,716 A * | 4/1999 | Haldeman et al. | 56/14.5 |
| 6,000,205 A * | 12/1999 | Joray | 56/294 |
| 6,079,194 A | 6/2000 | Waldrop | |
| 6,658,830 B2 * | 12/2003 | Wetzel | 56/12.9 |

* cited by examiner

FLAIL MOTOR HEAD ATTACHMENT

BACKGROUND OF THE INVENTION

The present invention relates generally to head attachments for harvesting machines and, more particularly, to a flail rotor head attachment which is especially adapted for use in conjunction with a forage harvester.

The automation of crop harvesting is an integral aspect of modern agriculture. Devices to aid and improve the harvesting process are widely sought after to reduce costs and improve efficiency. Automation has increased the speed at which many crops are harvested and it has reduced the necessity of manual labor. However, the automation of harvesting still remains relatively expensive in instances where the use of multiple machines is required due to the costs of paying machine operators, fuel, maintenance and the purchase of the machines themselves.

Once a crop has been harvested from a field, varying amounts of crop residue (e.g. stalks, leaves, roots, chaff, tare, stubble, straw, cobs, pods, hulls, fibers, silage, fodder or other plant matter) remain in the harvested fields. Crop residue has a number of different uses, for example, it is sometimes further processed in a variety of ways for use as bio-fuel, animal feed or other bi-products. Collecting crop residue from harvested fields oftentimes involves the use of several different types of machines. For example, once a corn crop has been harvested, standing corn stubble or already combined corn stalks remain in the field. This corn stubble or stalks is typically harvested for use as animal feed. Normally a series of machines or operations are required to collect the corn residue and convert it into animal feed. First, the corn stubble or stalks need to be cut, chopped and windrowed in a first operation. Windrowing is a row of cut crop residue such as a small grain crop or hay which is organized and collected in a row on the ground and allowed to dry before being baled, combined or rolled as necessary. Typically, a flail windrower machine is used to accomplish this task. A flail windrower will cut, shred and windrow the remaining corn stalks in a single pass and will build neat, uniform windrows on the ground ready for baling or stacking. Depending upon the type of crop residue, the volume of such residue from time to time may necessitate the use of a rake for combining two or more windrows together, creating piles of crop residue large enough to be processed such as by a forage harvester.

Once the corn residue is windrowed, the windrowed stalks are typically baled in a second operation through the use of a baler machine. The baler will parcel the crop residue into bales for pickup at a later time. Alternatively, if a baler is not used, a forage harvester may be used to pick up the windrowed crop residue and load the same into a vehicle for transport. The bailed or otherwise gathered corn residue is then transported to a feed yard in a transportation operation where the bales or collected crop residue are then further ground and mixed with other feed or supplements in a further operation for use as animal feed. These multiple operations are time consuming; they can take several days or weeks to accomplish; and the use of multiple machines is expensive when you consider the cost of each machine, the fuel consumption required, and the manpower necessary to accomplish these multiple tasks.

In present day harvesting operations, there is therefore a need for improving the efficiency of gathering and collecting crop residue and for reducing the number of machines and/or operations necessary to accomplish the task. Streamlining the overall operation and reducing the overall costs involved is desirous.

SUMMARY OF THE INVENTION

The present invention teaches the construction and operation of several embodiments of a flail rotor head attachment adaptable for use with a forage harvester and other machines in gathering, collecting, cutting and chopping crop residue such as already combined corn stalks in a single pass for use as animal feed or other bi-products. The present apparatus combines multiple operations associated with gathering and using crop residue, which streamlined operation is more efficient, greatly improves the method of harvesting crop residue, eliminates multiple passes over the same harvested field using a multitude of different types of farm equipment, and it greatly improves profitability. By mounting the present flail rotor head attachment on the front of a forage or silage harvester, the operator is able to extract corn stalks or stubble or other crop residue from a row, cut and chop the foliage into a ready-to-feed form, and then place the chopped crop residue into a vehicle such as a truck or wagon for transportation to a feed yard or other location. This process is completed with one machine and one operator thereby replacing the need for the use of multiple machines and multiple operators as presently accomplished. The present apparatus and process eliminates the need for use of a flail windrower for windrowing the crop residue, and it likewise eliminates the need for raking, baling or rolling the crop residue prior to transportation to its end destination.

In accordance with the teachings of one embodiment of the present invention, a flail rotor head attachment for gathering standing or downed crop residue is disclosed wherein the apparatus includes a housing and associated frame structure operably coupled to the front portion of a forage harvester or other harvesting type machine, the housing including a flail rotor and an auger. The flail rotor includes a plurality of cutting elements for cutting and/or chopping crop residue enroute to the forage harvester. In this regard, the flail rotor is positioned and located so as to pick up the crop residue directly off of the ground and then feed such crop residue into an associated auger for funneling the residue through the input opening associated with the forage harvester. The auger feeds the crop residue from each opposite end portion towards the center for discharge into the inlet opening of the forage harvester. A driveline with an associated drive sprocket powers the flail rotor and auger through connection to the forage harvester. In this regard, the present apparatus includes a drive assembly which is powered by the driveline for moving the flail rotor and auger in the same direction. The drive assembly may include a plurality of pulleys, drives, tensioners, and other mechanisms for connecting the flail rotor and the auger to the driveline. The driveline is conventionally coupled to a gear box or other power means associated with the forage harvester or an adapter as will be hereinafter further explained.

In another aspect of the present invention, the flail rotor head attachment is provided with a rake mechanism for receiving crop residue from the flail rotor and thereafter passing such crop residue onto the auger. In this particular embodiment, the rake mechanism is located between the flail rotor and the auger and includes a shaft with a plurality of pick-up teeth associated therewith. The rake shaft is likewise coupled to the drive assembly for powering the rake mechanism through the driveline associated with the present apparatus. Depending upon the type of crop residue being collected, the rake mechanism will improve the pick-up and funneling of the crop residue to the auger. Where the rake mechanism is utilized, the flail rotor and rake will rotate in the same direction while the auger will rotate in the opposite direction.

The flail rotor, auger and rake mechanisms are all supported on a frame structure associated with the overall housing. This frame structure likewise includes an attachment mechanism for coupling the overall head attachment to a forage harvester or other crop harvesting machine. In addition, it is recognized and anticipated that the flail rotor, rake mechanism and auger may include a plurality of such mechanisms coupled together for unit movement. The housing may likewise include a hood for providing access to the internal structure of the present head attachment. Still further, the various embodiments of the present flail rotor head attachment can be utilized and coupled to any work machine in accordance with the teachings of the present invention.

It is therefore an object of the present invention to improve the overall efficiency of removing crop residue from a harvested field by eliminating the multiple passes which are currently necessary to accomplish this task.

These and other objects and advantages of the present flail rotor head assembly will become apparent to those skilled in the art after considering the following detailed description of several illustrative embodiments of the present invention in connection with the accompanying drawings.

BRIEF DESCRIPTION OF THE DRAWINGS

For a better understanding of the present invention, reference may be made to the accompanying drawings.

Figure 1:
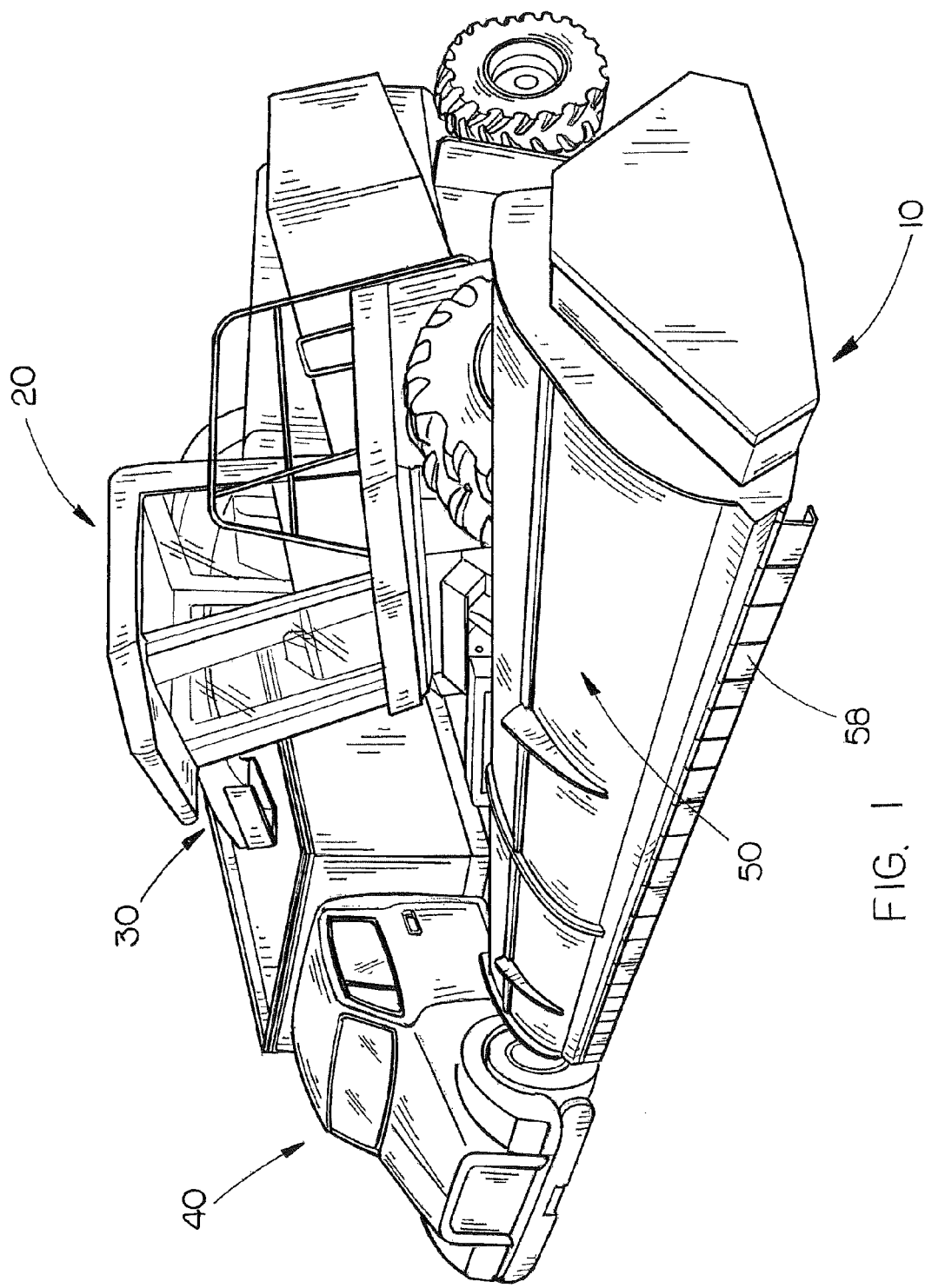
FIG. 1 is a perspective view of one embodiment of the present flail rotor head assembly constructed in accordance with the teachings of the present invention shown attached to a forage harvester.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Referring now to the drawings more particularly by reference numbers, wherein like numerals refer to like parts, FIGS. 1-7 identify one embodiment of a flail rotor head attachment 10 for cutting and collecting crop residue from the ground. The flail rotor head attachment 10 may be operably attached to a forage harvester such as the forage harvester 20, or to any other similar type of machine which further processes crop residue. In this embodiment, the forage harvester 20 operates in a traditional manner by cutting and chopping the crop residue and the present flail rotor head attachment 10 operates to more effectively and efficiently gather, collect and cut crop residue prior to entry into the forage harvester in a single pass thereby eliminating multiple passes over the same harvested field with different types of farm equipment to accomplish the same task. Once the crop residue has been processed by both the present head attachment 10 and the forage harvester 20, the forage harvester 20 feeds the crop residue into a chute 30 for depositing the crop residue into a vehicle such as the vehicle 40 illustrated in FIG. 1 for transporting the processed crop residue to its end destination.

As illustrated in FIGS. 2, 3A, 3B, 4 and 5, the flail rotor head attachment 10 includes a housing 50 and associated frame structure for operably connecting or coupling the attachment 10 to the front portion of a forage harvester 20. The housing 50 may further include a hood 60 which may be removably attached or otherwise opened and/or removed for access to the flail rotor 70 and the auger 80. The housing 50 may be operably attached to the frame structure by any suitable attachment means.

Figure 4:
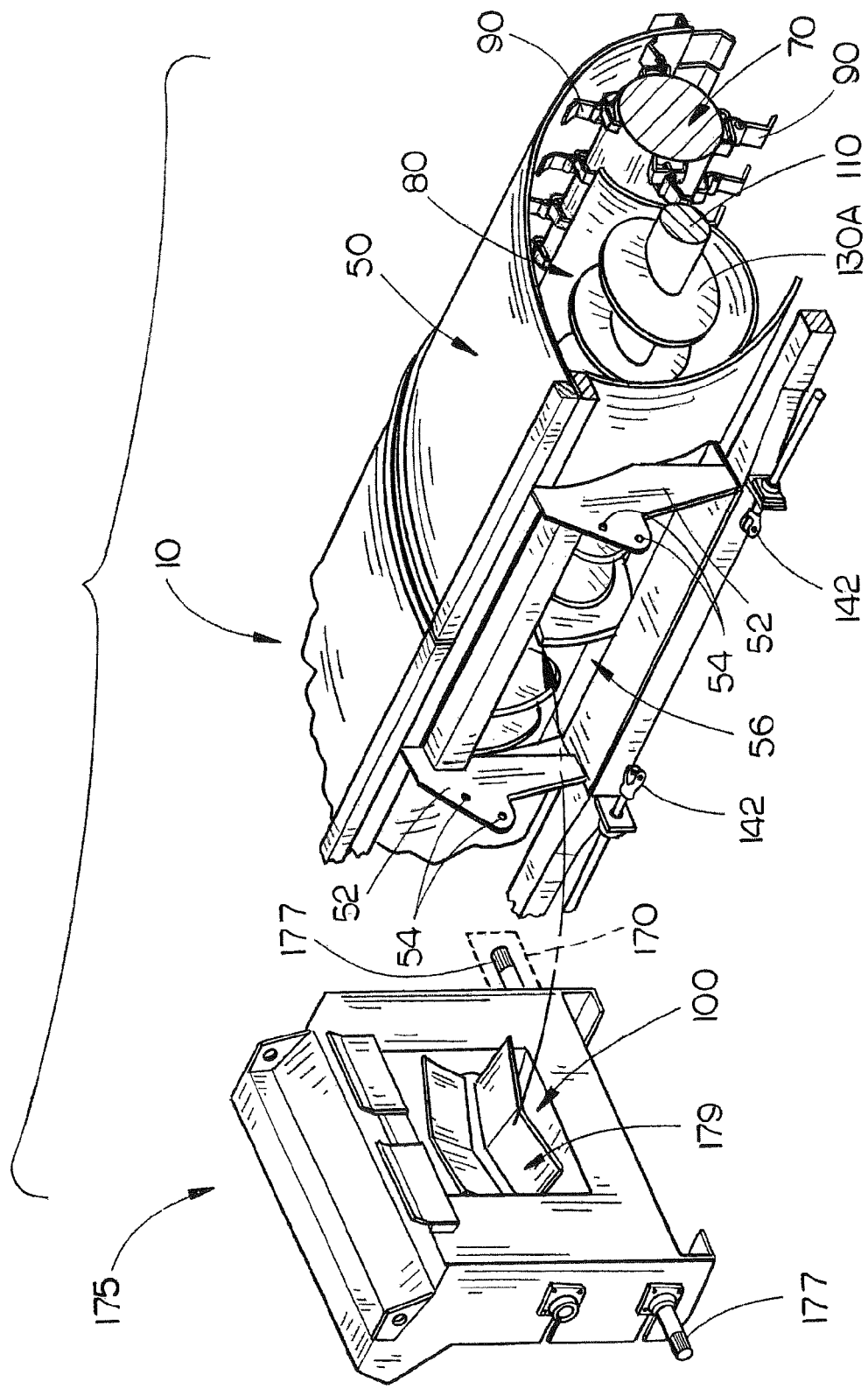
FIG. 4 is a partial perspective view showing a conventional Kuma adapter and the exit opening of the flail rotor head attachment of FIG. 1.

The present head attachment 10 may likewise be operably attached to the front portion of the harvester 20 by any suitable coupling means such as through the use of a pair of spaced apart flange members 52 which are positioned and located so as to engage corresponding means on the front of the forage harvester 20, or on a conventional adapter unit such as Kuma adapter 175, for fixedly attaching the head attachment 10 to the front of the harvester 20 as best illustrated in FIG. 4. The flange members 52 may include openings 54 for facilitating the attachment. The flange members 52 are shown in FIG. 4 as being located on opposite sides of an exit opening 56 associated with housing 50 as will be hereinafter explained.

In one embodiment, the flail rotor head attachment 10 includes a flail rotor 70 and an auger 80. The attachment 10 may include one or more flail rotors 70 operatively coupled together to function as a single unit, and it may include one or more augers 80 similarly operatively coupled together to function as a single unit, depending on the desired length of the overall head attachment 10 as will be hereinafter further explained.

Figure 2:
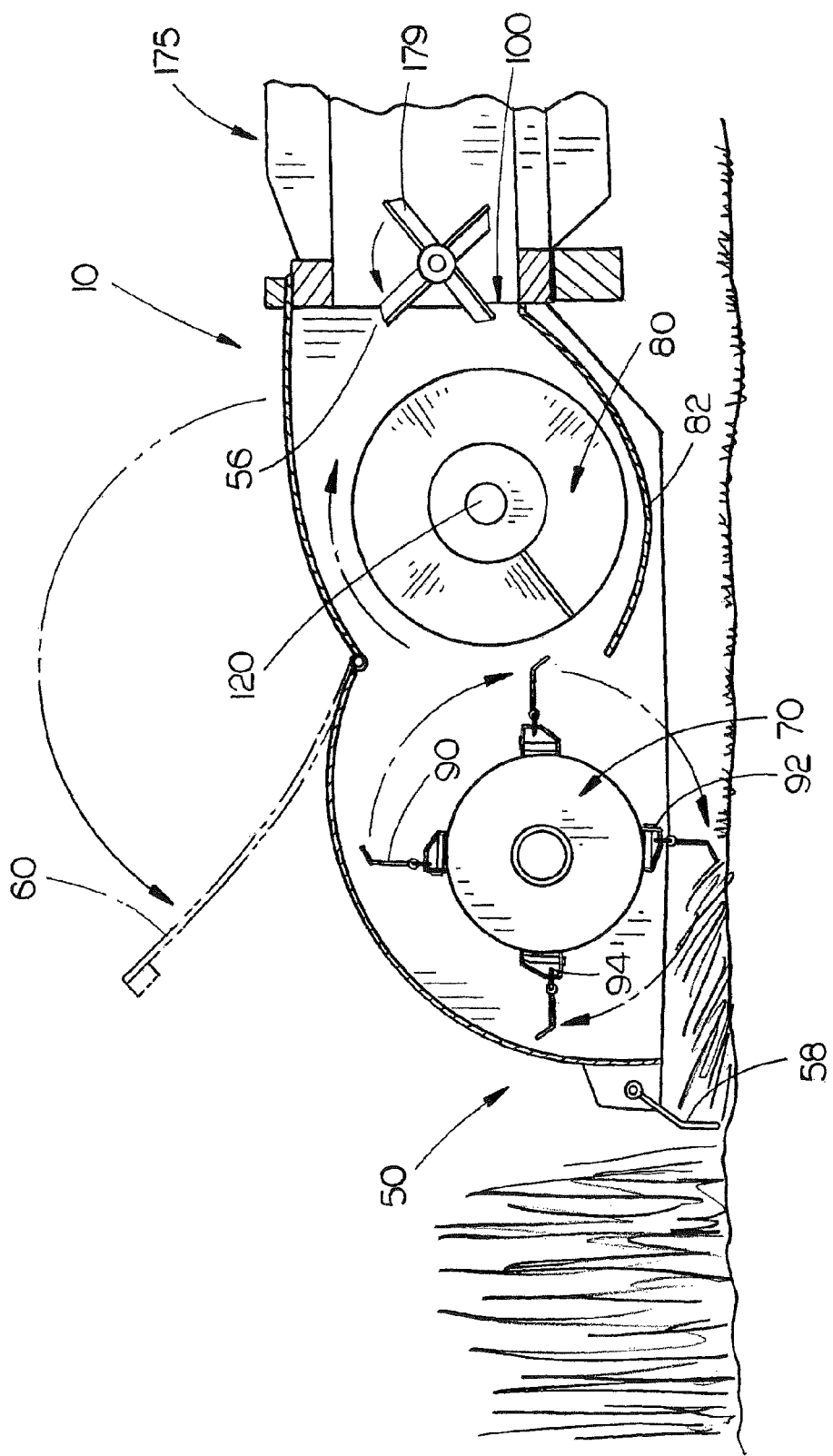
FIG. 2 is a cross-sectional view of the present flail rotor head attachment of FIG. 1 taken through the exit opening of the housing and the input opening of an adapter associated with a forage harvester.
Figure 3:
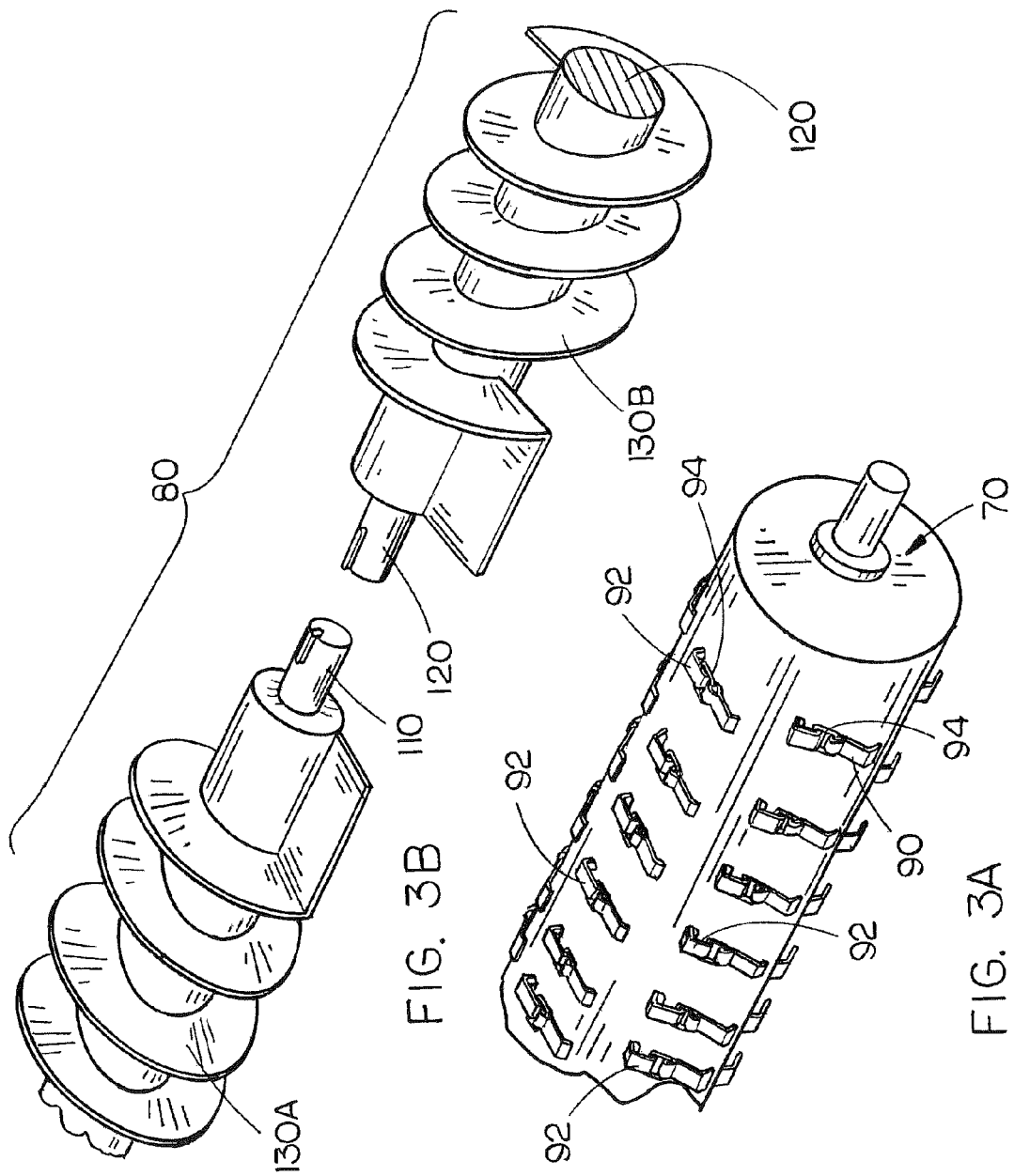
FIG. 3A is a partial perspective view of one embodiment of a flail rotor associated with the flail rotor head attachment of FIG. 1.
FIG. 3B is a partial perspective view of one embodiment of an auger associated with the flail rotor head attachment of FIG. 1.

The flail rotor 70 as best illustrated in FIGS. 2-4 and 6-8 is positioned in front of auger 80 and includes a plurality of cutting elements 90 for cutting and/or chopping crop residue as it picks up such residue from the ground and funnels it to the auger 80 and to the forage harvester 20. The cutting elements 90 may be removable from the flail rotor 70 for facilitating sharpening and/or replacement and, in the embodiment illustrated in FIGS. 2-4, are operably secured to the flail rotor 70 such that they extend outward in their operative position when the flail rotor 70 is in motion. In this regard, each cutting element 90 is freely attached to a bracket or clamp member 92 by means of a carriage clasp or ring type member 94 which allows the cutting element 90 to freely move from a position wherein the element 90 lies adjacent to or abutting the flail rotor 70 as shown in FIG. 3A to an operative extended position as shown in FIGS. 2 and 4. The rotational movement or centrifugal force generated by rotation of the flail rotor 70 keeps the cutting elements 90 extended to both cut and collect the crop residue as the attachment 10 moves through a harvested field. The bracket member 92 may include a stop mechanism or other structure for preventing the cutting elements 90 from over extending. In an alternative embodiment, the cutting elements 90 may be attached to the flail rotor 70 so as to permanently extend in an operative position. The flail rotor 70 functions to cut, chop and remove crop residue including harvested corn stalks directly from the ground. The flail rotor 70 is also positioned and located in the housing 50 and relative to the auger 80 as illustrated in FIG. 2 so as to feed the crop residue into auger 80 for funneling the crop residue out of the housing exit opening 56 (FIG. 4) and into the input opening 100 of a conventional Kuma adapter 175.

Figure 6:
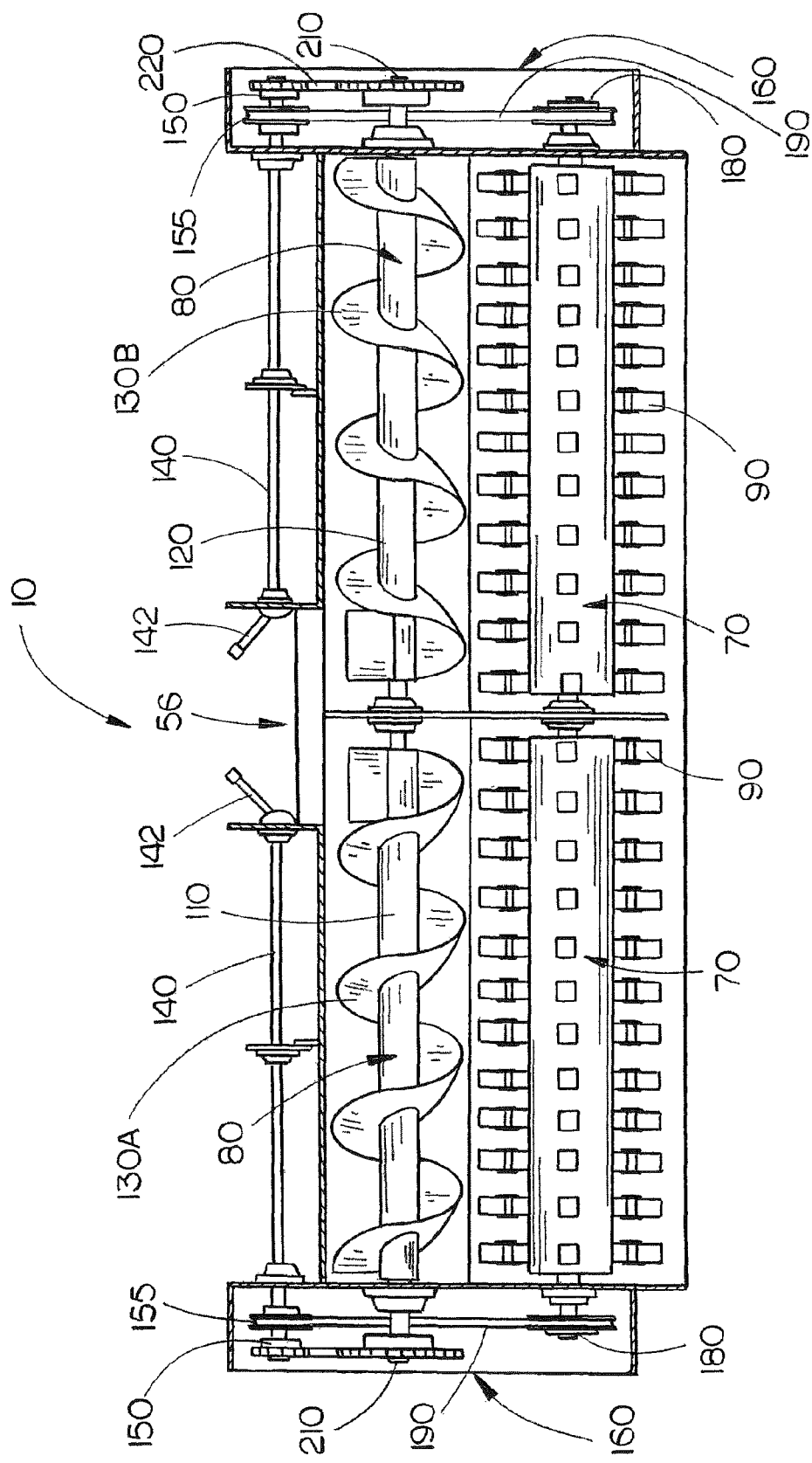
FIG. 6 is a bottom plan form view of the flail rotor head attachment of FIG. 1.
Figure 7:
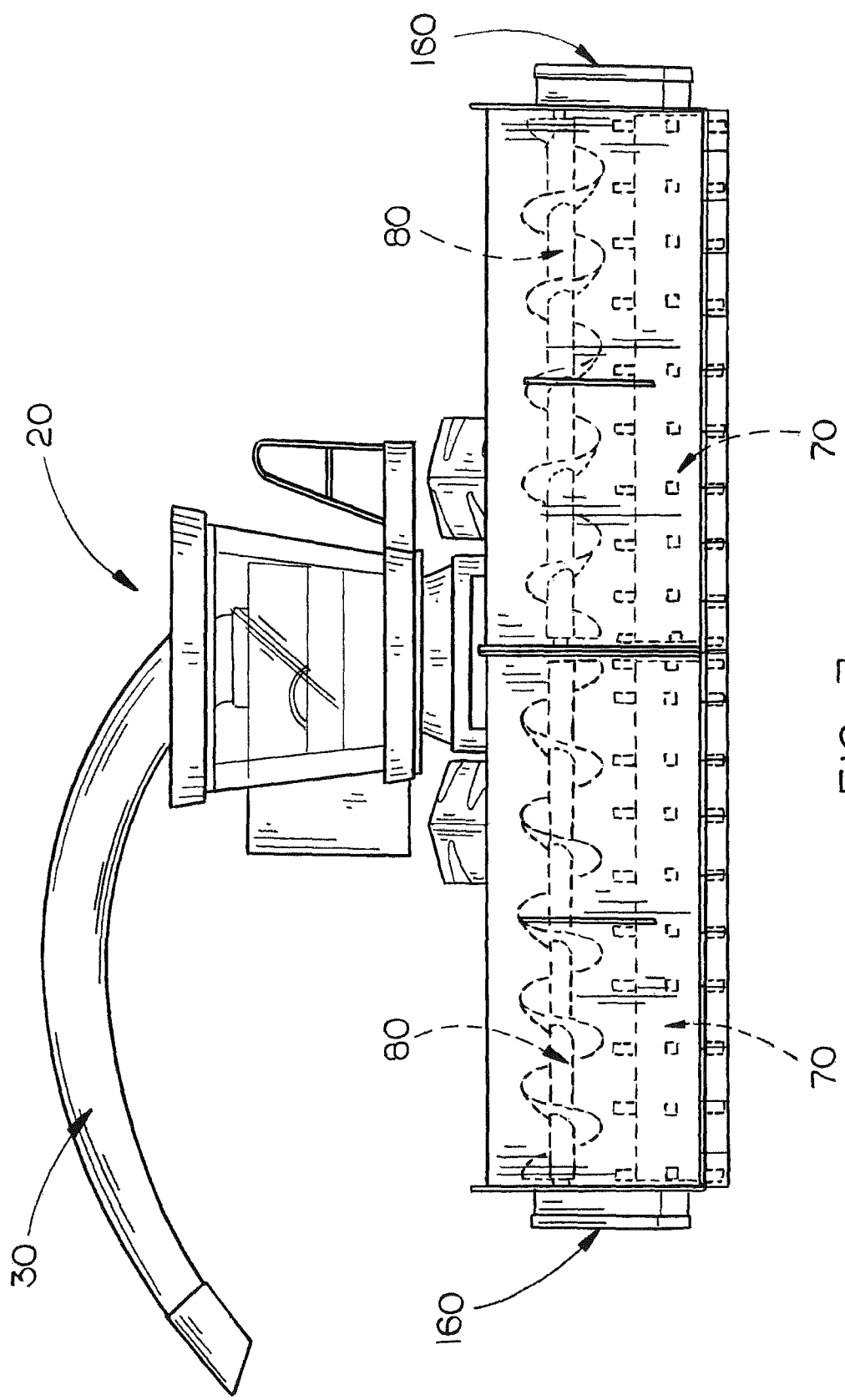
FIG. 7 is a front elevational view of the flail rotor head attachment of FIG. 1 attached to a forage harvester.

It is also recognized that the flail rotor 70 can include a single rotor extending the full width of the head attachment 10 such as the width illustrated in FIG. 1, or the flail rotor 70 can include a plurality of rotors 70 coupled in operative alignment with each other so as to span the entire width of the head attachment 10 and such that the drive assemblies 160 associated with each opposite end of the attachment 10 drive the entire plurality of flail rotors 70. In this regard, as best illustrated in FIG. 6, a pair of flail rotors 70 are illustrated therein connected in operative alignment with each other and coupled at each opposite end to a respective drive assembly 160 for powering the same. It is recognized and anticipated that any plurality of flail rotors, including more than two rotors 70, can be operatively connected in alignment with each other to both accommodate the overall width of the head attachment 10 and to facilitate installation and maintenance thereof.

The flail rotor head attachment 10 likewise includes an auger 80 as best illustrated in FIGS. 2-4 and 6. The auger 80 includes a pair of flightings 130A and 130B as best illustrated in FIGS. 3B and 6, each fighting 130 being oriented in a manner so as to funnel the crop residue coming into contact with the flightings 130A and 130B from the flail rotor 70 towards the center of the head attachment 10 and, more particularly, towards the housing exit opening 56 for feeding such crop residue through the exit opening 56 and into the input opening 100 associated with the Kuma adapter 175 (FIG. 4). As illustrated in FIGS. 3B and 6, the auger 80 in this particular embodiment includes two separate augers coupled in operative alignment with each other, one auger 80 including the flighting 130A and the other auger 80 including the fighting 130B. As best illustrated in FIG. 3B, auger 80 including the fighting 130A includes a shaft portion 110 and the auger 80 including fighting 130B includes a shaft portion 120, the shaft portions 110 and 120 being operatively connected together at one end portion thereof as illustrated in FIG. 6 and having their opposite end portions connected to the respective drive assemblies 160. The auger 80 is positioned and located aft of the flail rotor 70 and rotates in the same direction as compared to the flail rotor 70 such that the crop residue received from the flail rotor 70 is continuously moved and funneled rearwardly through the auger 80 and across the upper portion of the housing and through the housing exit opening 56 as illustrated in FIG. 2. The housing 50 may include a shield member 82 positioned and located underneath the auger 80 and adjacent to the flail rotor 70 for facilitating the funneling of the crop residue from the flail rotor 70 to the auger 80. The shield 82 also helps to prevent crop residue from falling to the bottom of the housing 50 and becoming unavailable for funneling to the forage harvester 20.

As with the flail rotor 70, any plurality of augers 80 can be operatively connected in alignment with each other so long as the flightings 130A and 130B are properly oriented with respect to the plurality of augers so that the crop residue is again funneled to the middle of the housing and to the exit opening 56. It is likewise recognized and anticipated that a single auger 80 can be utilized so long as the flighting associated with each opposite end portion of a single auger is again configured differently so as to be comparable to the flightings 130A and 130B such that the crop residue will be funneled to the center portion of the housing 50.

Figure 5:
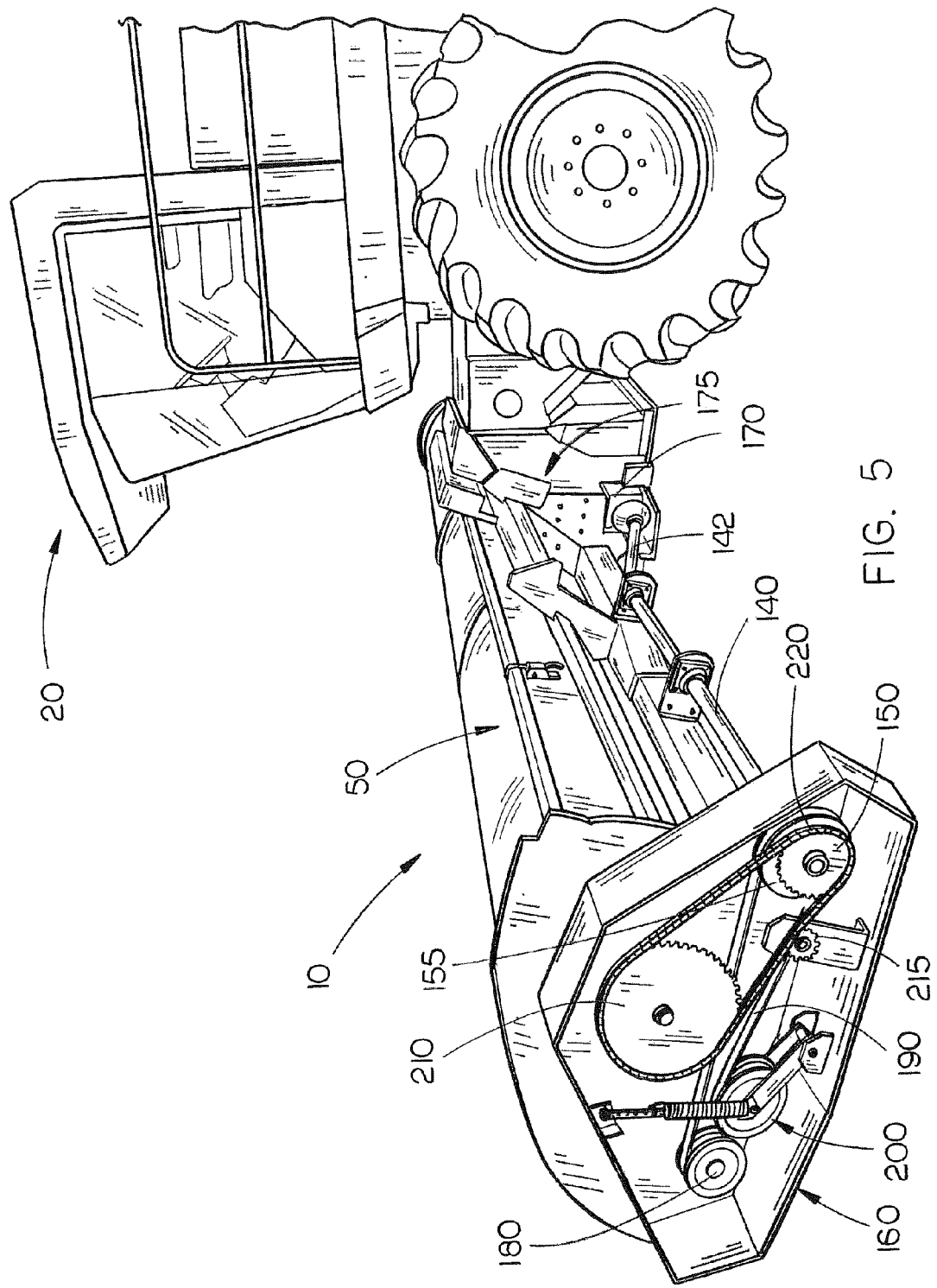
FIG. 5 is a perspective view of the flail rotor head attachment of FIG. 1 attached to a forage harvester and showing the drive assembly associated therewith.

As best illustrated in FIGS. 5 and 6, a driveline 140 is associated with the rear portion of the head attachment 10 for providing power to the drive assemblies 160 located at each opposite end portion of the flail rotor 70 and auger 80. The driveline 140 and the drive assemblies 160 form the drive mechanism of the attachment 10. The driveline 140 includes a drive sprocket 150 located at each opposite end portion thereof for powering the auger 80 and it likewise includes a sprocket or pulley 155 located at each opposite end portion thereof for powering the flail rotor 70 as will be hereinafter further explained. The entire drive assembly 160 located at each opposite end of the head attachment 10 is powered by the driveline 140 which is conventionally coupled to a gear box 170 or other power means associated with either the adapter 175 or the forage harvester 20.

The drive assemblies 160 may include a plurality of pulleys, sprockets, drives, tensioners and other mechanisms for connecting the flail rotor 70 and the auger 80 to the driveline 140. In this regard, as best illustrated in FIG. 6, the driveline 140 is split at the center thereof and includes a pair of connecting members 142 for coupling to a gear box 170 or other power means associated with either an adapter or the forage harvester 20. In the particular embodiment illustrated in FIGS. 4 and 5, a conventional Kuma adapter 175 is utilized between the forage harvester 20 and the present head attachment 10 for coupling the head attachment 10 to the harvester 20. The Kuma adapter is well-known in the industry and is used to attach any combine-type head to a forage harvester. The Kuma adapter 175 includes a drive shaft 177 (FIG. 4) which is attachable at each opposite end portion to the coupling members 142 associated with driveline 140. A gear box 170 (FIGS. 4 and 5) is associated with the adapter 175 and powers the drive shaft 177. In turn, the driveline of the forage harvester 20 is connected to the gear box 170 and powers the same. Here again, depending upon the type of adapter used, the driveline 140 can be connected to the power means of the forage harvester 20 through the adapter by any suitable means. Still further, in certain situations, it is also recognized and anticipated that the driveline 140 can be coupled directly to the power means associated with the forage harvester by any suitable coupling means.

In the embodiment illustrated in FIGS. 5 and 6, the drive assemblies 160 each further include an auger drive sprocket 210 which is operatively coupled to the auger 80 and is further operatively coupled to the drive sprocket 150 via a chain, belt or other drive means 220 for facilitating rotation thereof as best illustrated in FIG. 5. In similar fashion, the flail rotor 70 includes a flail drive pulley or sprocket 180 which is operatively coupled to the flail rotor 70 and is further operatively coupled to the drive pulley or sprocket 155 via a belt, chain or other drive means 190 for facilitating rotation thereof as best illustrated in FIG. 5. A tensioning mechanism 200 is positioned and located adjacent to the flail drive pulley or sprocket 180 and engages the belt or other drive means 190 for ensuring that the drive means 190 remains tight when the flail rotor 70 is in operation. A similar tensioning sprocket 215 is positioned and located to engage the chain or other drive means 220 for ensuring that the drive means 220 remains tight when the auger 80 is in operation. It is recognized and anticipated that other drive assembly arrangements may likewise be utilized at each opposite end of the head attachment 10 for turning the flail rotor 70 and the auger 80 in the same direction. It is also recognized and anticipated that only one drive assembly 160 located at only one of the opposite ends of the attachment 10 may be utilized to rotate the flail rotor 70 and the auger 80.

In operation, when the driveline 140 is engaged and rotating, the drive sprocket 150 in conjunction with the auger sprocket 210 and its associated drive means 220 turn the auger 80 in one direction. In a similar arrangement, the drive pulley or sprocket 155 in conjunction with the flail drive pulley or sprocket 180 and its associated drive means 190 turn the flail rotor 70 in one direction. As best illustrated in FIG. 2, the flail rotor 70 cuts and picks up crop material from the ground and the cutting elements 90 move the crop residue to the auger 80 so that the auger 80 can then funnel the crop residue through the housing exit opening 56 and into the adapter opening 100 for feeding the crop residue into the forage harvester 20. The housing 50 associated with the present head attachment 10 is configured so as to facilitate the funneling of the crop residue from the flail rotor 70 to the auger 80.

As best illustrated in FIG. 4, the Kuma adapter 175 likewise includes a conveying means in the form of rotating blades 179 for feeding the crop residue through the Kuma adapter 175 and into the forage harvester. Once the crop residue is inside the forage harvester, the harvester 20 will further cut, chop and process the crop residue into a ready-to-feed form for transfer to a vehicle such as the vehicle 40 (FIG. 1) for transportation to a feed yard or other location. The additional cutting and chopping accomplished by the flail rotor 70 and its ability to gather and collect crop residue directly from the ground enables the forage harvester to further process such residue into a ready-to-feed form. This process is completed with one machine and one operator in a single pass thereby replacing the need for using multiple machines and multiple operators such as use of a flail windrower for first windrowing the crop residue, and it likewise eliminates the need for raking, baling or rolling the crop residue for further processing at another location.

Figure 8:
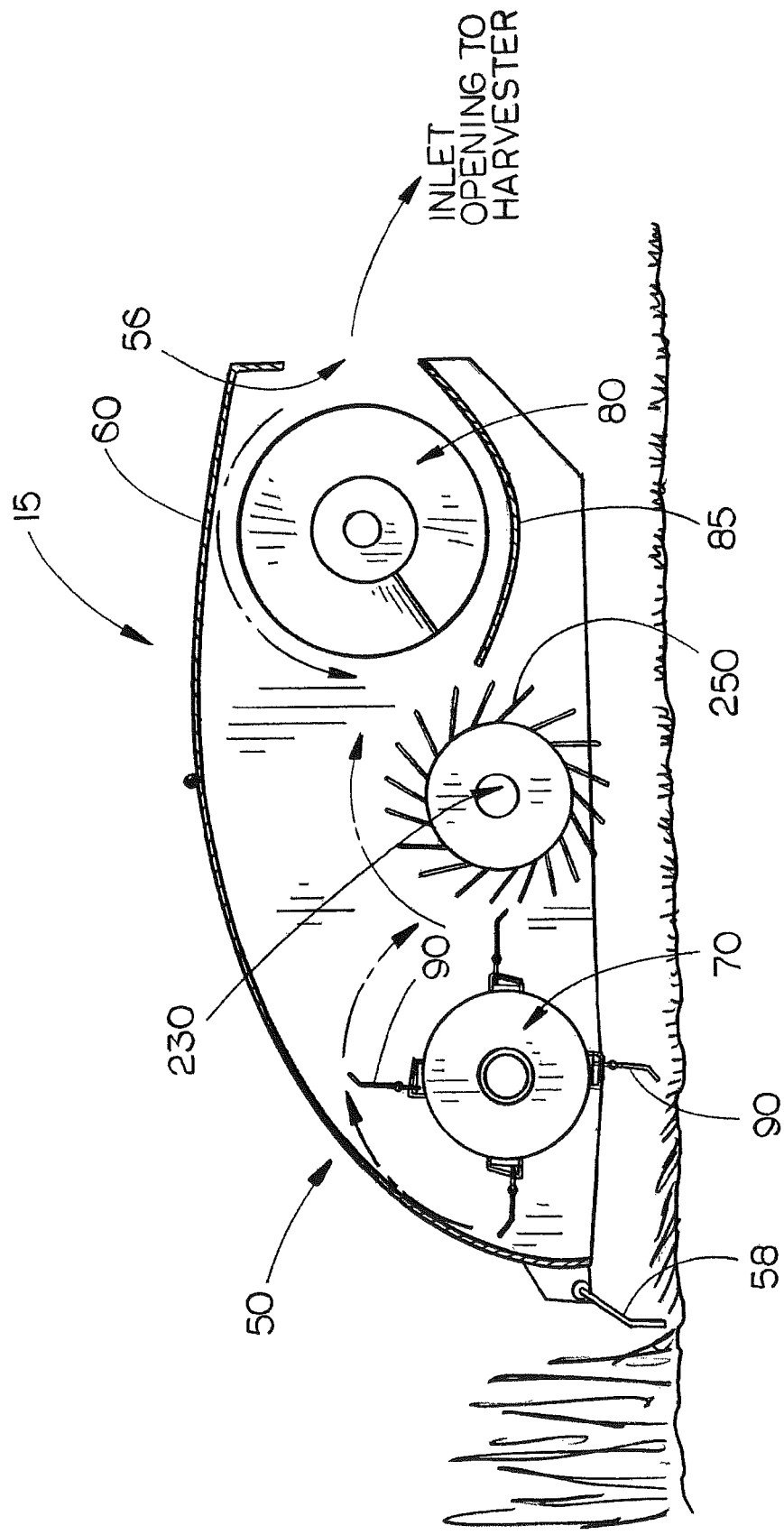
FIG. 8 is a cross-sectional view of another embodiment of the present flail rotor head attachment taken through the exit opening of the housing and the input opening of a forage harvester constructed in accordance with the teachings of the present invention.

In yet another embodiment illustrated in FIG. 8, the present flail rotor head attachment 15 may include a flail rotor 70, an auger 80 and a rake 230 positioned therebetween. The rake 230 includes a plurality of tines 250 for further engaging the crop residue and facilitating the funneling of the crop residue from the flail rotor 70 to the auger 80. Depending upon the type of crop residue being collected, the tines 250 of the rake 230 help to further break up the crop residue and move such residue to the auger 80 thereby preventing any clogging or jamming of the crop residue enroute to the auger 80. The tines 250 may be removable for facilitating adjustment and/or replacement and they can be secured to the rake 230 in any conventional manner. In this embodiment, the attachment 15 is coupled directly to the front portion of the forage harvester 20.

Like the flail rotor 70 and auger 80, depending upon the overall width of the present head attachment 15, any plurality of rakes 230 may be operatively connected in alignment to further facilitate movement of the crop residue within the housing 50. Like flail rotor 70 and auger 80, the rake 230 is connected to at least one drive assembly 160' (FIG. 9) in a conventional manner such as by including additional drive sprockets or pulleys at at least one opposite end portion of the driveline 140' for operative connection to a rake drive sprocket or pulley associated with at least one opposite end of the rake 230. Rotation of the driveline 140' will likewise rotate the rake 230 in the same direction as flail rotor 70 when the associated sprockets and other drive components are operatively coupled to each other through the use of chains, belts, gear boxes or other drive mechanisms. The auger 80 will rotate in the opposite direction relative to flail rotor 70 and rake 230. Since the rake 230 turns in the same direction as the flail rotor 70, the drive pulley or sprocket associated with the rake 230 could be coupled to the pulleys or sprockets 155 and 180 associated with flail rotor 70 for movement in the same direction as the flail rotor 70 and in the opposite direction as the auger 80.

Figure 9:
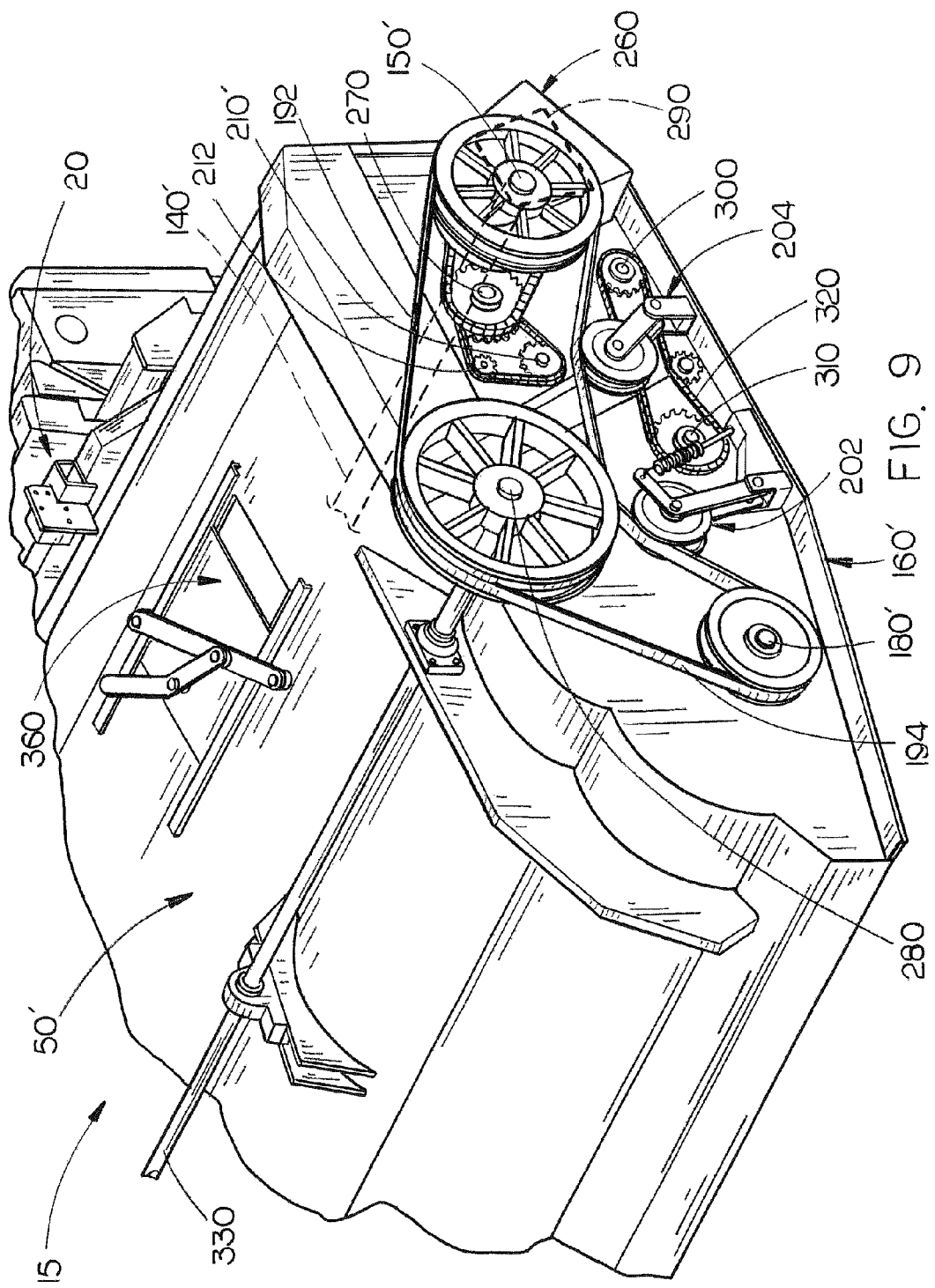
FIG. 9 is a partial perspective view of the flail rotor head attachment of FIG. 8 attached to a forage harvester and showing the drive assembly associated therewith.

FIG. 9 illustrates one embodiment of a drive assembly 160' for driving the flail rotor 70, the rake 230 and the auger 80. A driveline 140' is associated with the rear portion of the head attachment 15 for providing power to the drive assembly 160' located on one end portion of the attachment. The driveline 140' powers and rotates the drive sprocket 150' and also powers a main gear box 260 located at the proximate end portion thereof. The drive assembly 160' may include a plurality of pulleys, sprockets, drives, tensioners and other mechanisms for connecting the flail rotor 70, the rake 230 and the auger 80 to the driveline 140'. In this regard, the driveline 140' includes a coupling member (not shown) for coupling the power means of the forage harvester 20 to the driveline 140' of the head attachment 15. In this particular embodiment, the driveline 140' can directly couple the head attachment 15 to the power means associated with the forage harvester 20 by any suitable coupling means. Still further, in certain situations, it is also recognized that an adapter may be utilized between the forage harvester 20 and the present head attachment 15 for coupling the head attachment 15 to the harvester 20.

The main gear box 260 is operatively coupled to a double sprocket 270 via a chain, belt or other drive means for facilitating the rotation of auger drive sprocket 210' as illustrated in FIG. 9. The auger drive sprocket 210' is further coupled to the auger 80 for facilitating rotation of the auger 80 in an opposite direction as compared to the flail rotor 70 and the rake 230. The gear box 260 is a reverse gear box which facilitates rotation of the double sprocket 270 in the opposite direction. The second sprocket (not shown) associated with sprocket 270 turns the auger drive sprocket 210' via a chain, belt or other drive means 212.

The drive sprocket 150' is further coupled to a driveline double sprocket 280 via a chain, belt or other drive means 192 for facilitating rotation thereof. Similarly, the double sprocket 280 is operatively coupled to a flail drive sprocket 180' via a chain, belt or other drive means 194 for facilitating rotation thereof. The flail drive sprocket 180' is further coupled to the flail rotor 70 for facilitating rotation of the flail rotor 70 in the same direction as the rake 230. In similar fashion, a rake gear box 290 located behind gear box 260 is coupled to the main gear box 260 for facilitating the rotation of a rake sprocket 300. The rake sprocket 300 is operatively coupled to a rake drive sprocket 310 via a chain, belt or other drive means 320 for facilitating the rotation thereof. The rake drive sprocket 310 is further coupled to the rake 230 for facilitating rotation of the rake 230 in the same direction as the flail rotor 70. A tensioning mechanism 202 is positioned and located adjacent to the flail drive sprocket 180' and engages the belt or other drive means 194 for ensuring that the drive means 194 remain tight when the flail rotor 70 is in operation. This tensioning mechanism 202 is similar to tensioning mechanism 200. An additional tensioning mechanism 204 is positioned and located adjacent to the double sprocket 280 and engages the belt or other drive means 192 for ensuring that the drive means 192 remains tight when the driveline double sprocket 280 is in operation. The housing 50' associated with the attachment 15 may likewise include a shield member 85 positioned and located as illustrated in FIG. 8 for likewise facilitating the funneling of the crop residue from the rake 230 to the auger 80.

Figure 10:
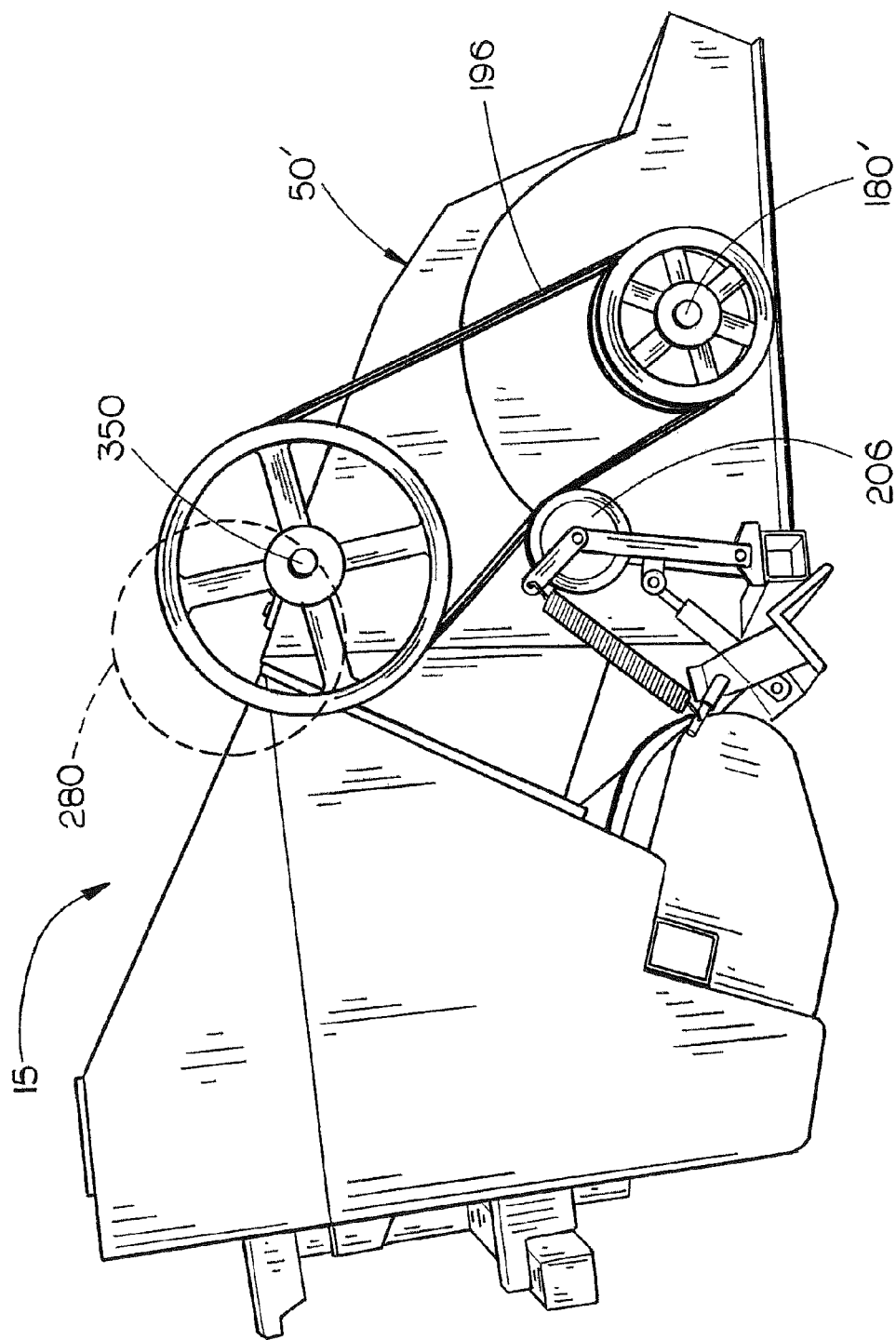
FIG. 10 is a side view of the second side of the flail rotor head attachment of FIG. 8

As best illustrated in FIGS. 9 and 10, the double sprocket 280 is operatively coupled to the driveline 330 for powering a corresponding sprocket 350 located on the opposite end portion of the attachment 15 relative to the double sprocket 280. The sprocket 350 is operatively coupled to a flail drive sprocket 180' via a chain, belt or other drive means 196 for facilitating rotation thereof at the opposite end portion of the attachment. A tensioning mechanism 206 is positioned and located adjacent to the flail drive sprocket 180' and engages the belt or other drive means 196 for ensuring that the drive means 196 remains tight when the flail drive sprocket 180' is in operation similar to tensioning mechanism 202. This arrangement provides additional drive power to the flail rotor 70. In this particular embodiment, the auger 80 and the rake 230 are powered from one side only of the attachment 15 via the drive assembly 160'.

It is likewise recognized and anticipated that other drive mechanisms could be utilized in association with drive assembly 160' for turning the rake 230 in the same direction as the flail rotor 70 and for turning the auger 80 in the opposite direction. In all other respects, the present head attachment 15 including the flail rotor 70, the auger 80, the housing 50, and its associated other components function and operate in a manner substantially similar to the operation of head attachment 10. Like attachment 10, attachment 15 can likewise be coupled to an adapter under certain conditions.

Either embodiment of the present invention, namely, head attachment 10 or head attachment 15, can be mounted to the front of a forage harvester 20 or other harvesting type machine in a conventional manner such as through the use of an adapter such as adapter 175, or they can be attached directly to a forage harvester 20, or by other conventional means, for extracting crop residue from a harvested field as explained above. Both embodiments of the present invention eliminate the need for multiple passes over the harvested field and both embodiments cut, chop and collect the crop residue for further processing by the forage harvester 20.

The housing 50 may also include a plurality of hollow tool bars 58 which function as a stabilizing means for the housing 50. It is recognized and anticipated that other means may likewise be used to stabilize the housing 50, if necessary. The housing 50 may further include a plurality of vents 360 (FIG. 9) which functions to regulate the release of heat, dust and exhaust from the attachments 10 and 15. It is recognized and anticipated that other means may likewise be used to vent the attachments 10 and 15, if necessary. It is also recognized that the front portion of the attachments 10 and 15 may likewise include any plurality of wheels (not shown) for facilitating movement of the attachments 10 and 15 through a harvested field.

Thus, there has been shown and described several embodiments of a novel head attachment to a forage harvester. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A flail rotor head attachment for attachment to a harvesting machine having crop residue processing elements, a power source and including an input opening for receiving crop residue into a harvesting machine, the attachment comprising:
   a frame structure for operatively coupling the attachment to the front portion of a harvesting machine;
   a housing having an exit opening for positioning in alignment with the input opening of a harvesting machine;
   a flail rotor mounted on said frame structure, said flail rotor including a plurality of cutting elements for picking up and chopping crop residue from a field;
   an auger mounted on the frame structure for receiving crop residue from the flail rotor, the auger having at least two flightings positioned in opposite directions for funneling crop residue towards the exit opening of the housing for delivery to the input opening of a harvesting machine; and
   a drive mechanism coupled to said flail rotor and said auger for rotating said flail rotor and said auger, said drive mechanism including a driveline and at least one drive assembly for driving said flail rotor and said auger in the same direction, said flail rotor and auger being positioned and located relative to each other such that rotation of said flail rotor and said auger in the same direction continuously funnels the crop residue across the upper portion of the housing and toward the exit opening of the housing, said driveline being adapted for coupling to a power source of a harvesting machine;
   said housing including a separate shield member positioned under said auger and adjacent to said flail rotor for funneling the crop residue from said flail rotor to said auger.

2. The flail rotor head attachment of claim 1 wherein the housing includes a hood for providing access to the flail rotor and auger.

3. The flail rotor head attachment of claim 1 wherein the plurality of cutting elements are removable.

4. The flail rotor head attachment of claim 1 wherein said frame structure includes coupling means for operatively attaching the attachment to the front portion of a harvesting machine.

5. The flail rotor head attachment of claim 1 wherein each of said cutting elements is attached to a separate respective bracket member, each cutting element being separately removable from a respective bracket member without removing said bracket member from said flail rotor, each bracket member allowing each respective cutting element to move freely between a first position wherein the cutting element lies adjacent to the flail rotor and a second position wherein the cutting element extends outwardly in an operative position.

6. The flail rotor head attachment of claim 1 wherein said flail rotor includes a plurality of rotors coupled in operative alignment with each other, said drive mechanism driving said plurality of flail rotors.

7. The flail rotor head attachment of claim 1 including an adapter coupled between the attachment and a harvesting machine, said adapter including means for feeding the crop residue from the exit opening of the attachment to the input opening of a harvesting machine.

8. The flail rotor head attachment of claim 5 including a stop mechanism associated with each bracket member for preventing the cutting elements from over extending.

* * * * *